United States Patent
Qiu

(10) Patent No.: US 11,093,651 B2
(45) Date of Patent: Aug. 17, 2021

(54) CROSS-CHAIN AUTHENTICATION

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/159,113

(22) Filed: Jan. 26, 2021

(65) Prior Publication Data

US 2021/0150065 A1 May 20, 2021

Related U.S. Application Data

(63) Continuation of application No. PCT/CN2019/106591, filed on Sep. 19, 2019.

(30) Foreign Application Priority Data

Nov. 16, 2018 (CN) .......................... 201811364964.9

(51) Int. Cl.
*G06F 21/64* (2013.01)
*H04L 9/32* (2006.01)

(52) U.S. Cl.
CPC ............ *G06F 21/64* (2013.01); *H04L 9/3247* (2013.01); *H04L 2209/38* (2013.01)

(58) Field of Classification Search
CPC .............................. G06F 21/64; H04L 9/3247
See application file for complete search history.

(56) References Cited

U.S. PATENT DOCUMENTS

| | | | | |
|---|---|---|---|---|
| 2016/0275461 A1* | 9/2016 | Sprague | ............... | H04L 9/3234 |
| 2016/0330034 A1* | 11/2016 | Back | .................... | H04L 9/3255 |
| 2017/0352027 A1* | 12/2017 | Zhang | ................. | G06Q 20/065 |
| 2018/0012311 A1 | 1/2018 | Guerrier et al. | | |
| 2019/0058581 A1* | 2/2019 | Wood | ................... | H04L 9/0637 |
| 2019/0081793 A1* | 3/2019 | Martino | ............... | H04L 9/0894 |

(Continued)

FOREIGN PATENT DOCUMENTS

| | | |
|---|---|---|
| CN | 106447309 | 2/2017 |
| CN | 106850200 | 6/2017 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Vance M Little
(74) *Attorney, Agent, or Firm* — Fish & Richardson P.C.

(57) ABSTRACT

A computer implemented method includes receiving, by a trusted execution environment (TEE) application, a cross-chain data request from a first blockchain node of a first blockchain; obtaining, by the TEE application, cross-chain data corresponding to the cross-chain data request from a second blockchain node of a second blockchain; verifying, by the TEE application, the cross-chain data; generating, by the TEE application, a signature using a private key of the TEE application, where a public key corresponding to the private key is stored in the first blockchain; and returning, by the TEE application, the cross-chain data and the signature to the first blockchain node.

15 Claims, 6 Drawing Sheets

(56) References Cited

U.S. PATENT DOCUMENTS

| | | | |
|---|---|---|---|
| 2019/0172026 A1* | 6/2019 | Vessenes | H04L 9/3247 |
| 2019/0188711 A1* | 6/2019 | Wu | G06Q 20/065 |
| 2019/0251199 A1* | 8/2019 | Klianev | G06Q 40/04 |
| 2019/0305935 A1* | 10/2019 | Qiu | H04L 9/3236 |
| 2019/0340267 A1* | 11/2019 | Vo | G06F 16/2365 |
| 2020/0026548 A1* | 1/2020 | Huang | G06F 9/466 |

FOREIGN PATENT DOCUMENTS

| | | |
|---|---|---|
| CN | 107450979 | 12/2017 |
| CN | 107566337 | 1/2018 |
| CN | 107862216 | 3/2018 |
| CN | 110008686 | 7/2019 |
| TW | 201732700 | 9/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application. No. PCT/CN2019/106591, dated Dec. 19, 2019, 10 pages (with partial English translation).

\* cited by examiner

CROSS-CHAIN AUTHENTICATION

CROSS-REFERENCE TO RELATED APPLICATIONS

This application is a continuation of PCT Application No. PCT/CN2019/106591, filed on Sep. 19, 2019, which claims priority to Chinese Patent Application No. 201811364964.9, filed on Nov. 16, 2018, and each application is hereby incorporated by reference in its entirety.

TECHNICAL FIELD

Solutions in embodiments of the present specification are related to the technical field of blockchain data processing, and in particular, to cross-chain data processing methods, apparatuses, and client devices, and blockchain systems.

BACKGROUND

The blockchain technology is also referred to as a distributed ledger technology. It is a decentralized distributed database technology that features decentralization, openness and transparency, tamper-resistance, and trustworthiness. Each piece of data of a blockchain is broadcast to all blockchain nodes of the entire network so that each node has full and consistent data. With the development and application of the blockchain technology, in addition to public blockchains that are open to the entire network, private blockchains, consortium blockchain, etc. also emerge. Cross-chain data exchanges between blockchain systems have become an important factor that needs to be considered in technical or service solutions. In existing cross-chain technologies, relay chains and other technical solutions can be used to implement cross-chain data exchanges between blockchains.

For blockchain systems to exchange data with each other, a blockchain usually needs to be able to authenticate data on other blockchains to guarantee the security of data transmission between the blockchain systems and protect the blockchain data from being tampered with.

SUMMARY

An objective of embodiments of the present specification is to provide cross-chain data processing methods, apparatuses, and client devices, and blockchain systems, to implement more efficient data authentication between blockchains, achieve better scalability and high efficiency, and extend applicability to more blockchain application scenarios.

The cross-chain data processing methods, apparatuses, and client devices, and blockchain systems provided in the embodiments of the present specification are implemented in the following ways:

A cross-chain data processing method is provided, where the method includes: sending, by a first blockchain, a cross-chain data request to a trusted attester; obtaining, by the trusted attester, cross-chain data from a second blockchain based on the cross-chain data request; verifying, by the trusted attester, the cross-chain data; and when the verification is passed, signing the cross-chain data by using a private key corresponding to a trusted execution environment (TEE) policy adopted by the trusted attester; returning, by the trusted attester, a signed request result to the first blockchain; and verifying, by the first blockchain, the request result by using a public key corresponding to the TEE policy; and when the verification is passed, determining that the cross-chain data in the request result is from the trusted attester and has been verified by the trusted attester.

A cross-chain data processing method is provided, where the method includes: receiving a cross-chain data request sent by a first blockchain; obtaining cross-chain data from a second blockchain based on the cross-chain data request; verifying the cross-chain data; and when the verification is passed, signing the cross-chain data by using a private key corresponding to a TEE policy adopted; and returning a signed request result to the first blockchain, where the request result includes the cross-chain data and the signature.

A cross-chain data processing apparatus is provided, where the apparatus includes: a request receiving module, configured to receive a cross-chain data request sent by a first blockchain; a data acquisition module, configured to obtain cross-chain data from a second blockchain based on the cross-chain data request; a data verification module, configured to verify the cross-chain data; and when the verification is passed, sign the cross-chain data by using a private key corresponding to a TEE policy adopted; and an attestation returning module, configured to return a signed request result to the first blockchain, where the request result includes the cross-chain data and the signature.

A cross-chain data processing client device is provided, including a processor and a memory that is configured to store a processor-executable instruction, where when executing the instruction, the processor implements the steps of: receiving a cross-chain data request sent by a first blockchain; obtaining cross-chain data from a second blockchain based on the cross-chain data request; verifying the cross-chain data; and when the verification is passed, signing the cross-chain data by using a private key corresponding to a TEE policy adopted; and returning a signed request result to the first blockchain, where the request result includes the cross-chain data and the signature.

A blockchain system is provided, where the system includes the apparatus or the client device according to any embodiments of the present specification.

A cross-chain system is provided, including at least two blockchains and a relay that corresponds to a target blockchain that returns cross-chain data, where a blockchain that requests for data obtains the cross-chain data from the target blockchain by using the corresponding relay, and the relay includes the apparatus according to any one of the embodiments of the present specification or any one of the method implementations of the present specification.

According to the cross-chain data processing methods, apparatuses, and client devices, and the blockchain systems provided in the embodiments of the present specification, data exchanges between blockchains can be implemented based on a TEE, to rapidly and efficiently implement cross-chain data authentication, implement high scalability of cross-chain data processing, and extend applicability to more cross-chain data exchange scenarios. With the solutions in the embodiments of the present specification, an upper-limit of cross-chain data throughput traffic can be increased efficiently with ease, effectively alleviating the problems that a conventional POS-based consensus relay has limited application scenarios and is relatively low in efficiency and poor in performance.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description merely show some embodiments of the present specification, and a person of ordinary skill in the art can still derive other drawings from these accompanying drawings without creative efforts.

DETAILED DESCRIPTION

Figure 1:
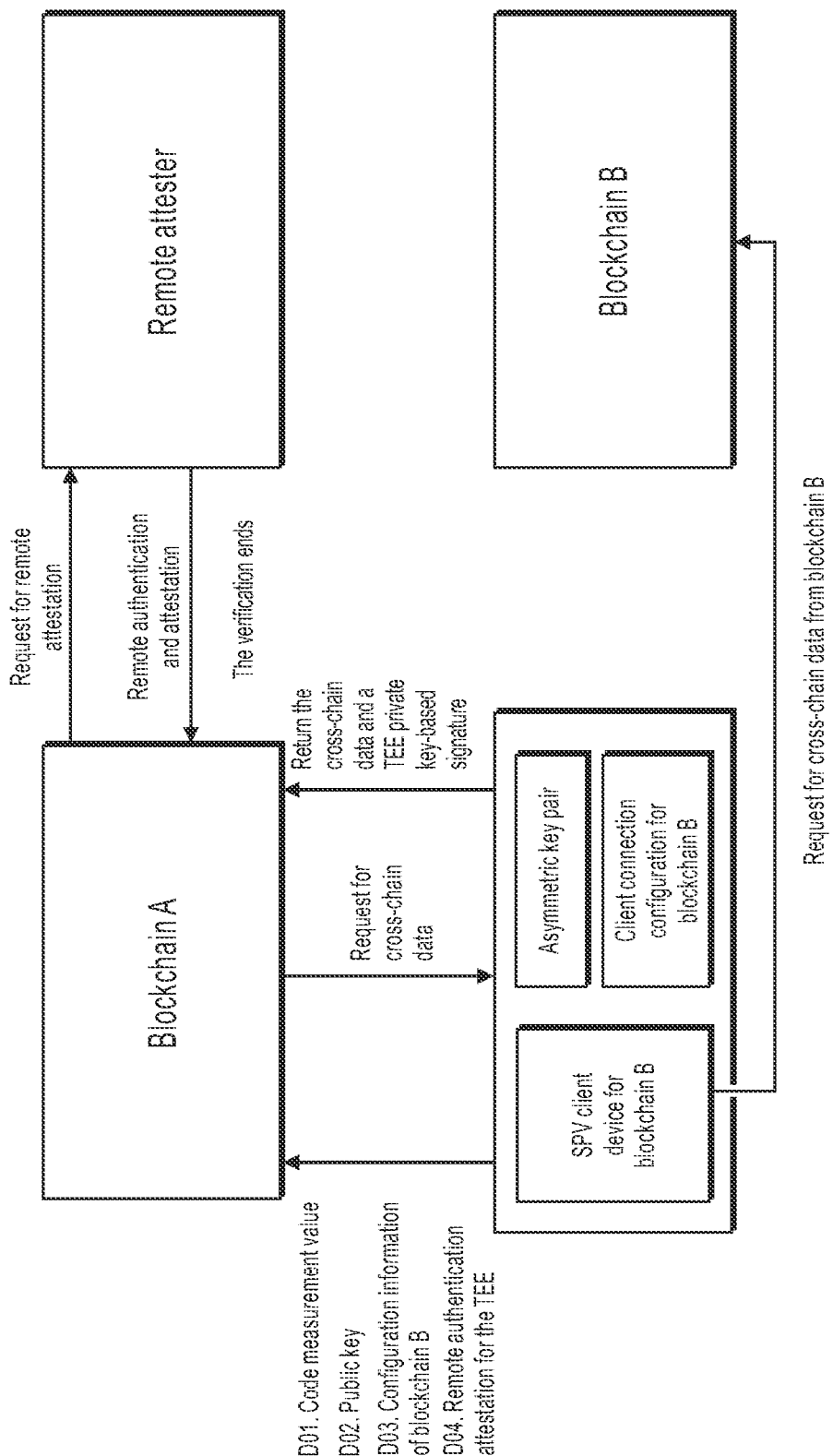
FIG. 1 is a schematic diagram illustrating a cross-chain data processing process and a system structure, according to the present specification.

To help a person skilled in the art better understand the technical solutions of the present specification, the following clearly and comprehensively describes the technical solutions in the embodiments of the present specification with reference to the accompanying drawings in the embodiments of the present invention. Clearly, the described embodiments are merely some but not all of the embodiments of the present specification. All other embodiments obtained by a person of ordinary skill in the art based on one or more embodiments of the present specification without creative efforts shall fall within the protection scope of the present application.

Data in a blockchain system usually supports attestation by a third party. Usually, when interacting with a blockchain system, an application system can choose to obtain data from a blockchain node in a trusted domain because the application system can trust the data on the node. As a member of a blockchain network, the blockchain node can authenticate data on the network. A near-end client device can be deployed in the application system. The client device can be designed to implement a blockchain protocol and can authenticate data in the blockchain system. Therefore, the application system can interact with a blockchain by using the client device. In the embodiments of the present specification, data exchanges between blockchain systems can also be implemented by using a client device, same as the data exchanges between the application system and the blockchain system.

In the solutions provided in the embodiments of the present specification, a client device that implements cross-chain data authentication can be implemented by using core logic of a trusted execution environment (TEE) so that the client device itself can authenticate data on blockchains. The TEE is usually a secure environment provided in a hardware device to ensure that sensitive data is stored, processed, and protected in an isolated and trusted environment. The TEE can represent an environment that is isolated from other modules in the hardware device and that can execute trusted application programs (code). The TEE can include a CPU and other elements, such as a memory and an I/O device. The TEE can be a runtime environment that coexists with the Rich operating system (Rich OS, which is usually ANDROID etc.) on the device and provides security services for the Rich OS. The TEE has its own execution environment and has a higher security level than the Rich OS. Software and hardware resources that the TEE can access are separated from the Rich OS. The TEE provides a secure execution environment for authorized software (which is a trusted application, for example, a blockchain verification application on the client device in the embodiments of the present specification), and also protects the confidentiality, integrity, and access permissions of resources and data. To guarantee a root of trust of the TEE, the TEE needs to pass verification and be separated from the Rich OS in a secure boot process.

Hardware technical solutions supporting TEEs can include the AMD Platform Security Processor (PSP), the ARM TrustZone technology (applicable to all the ARM processors supporting TrustZone), the x86-64 instruction set, etc. In the some embodiments provided in the present specification, Intel Software Guard Extensions (SGX) can be selected to implement a TEE. Intel SGX is a processor technology developed by Intel, a chip processor developer. SGX provides a trusted execution environment called an enclave. The enclave can prevent other application programs, including the OS, BIOS system, etc. from infiltration into and tampering with a state of a protected application program and data in the trusted environment. Once software and data are located in an enclave, even the operating system cannot affect the code and data in the enclave. The security boundary of the enclave includes only a CPU and the enclave. SGX can further introduce an attestation-based authentication mechanism. Logic of a remote verification mechanism can be packaged into a chip, and whether a program and a result of the program can be trusted is authenticated by Intel or an Intel agent in response to a request.

Specifically, FIG. 1 is a schematic flowchart illustrating a cross-chain data processing method, according to the present specification, and can also serve as a schematic diagram of a system architecture. Although the present specification provides the method operation steps, apparatuses, or systems structure illustrated in the following embodiments or accompanying drawings, the methods or apparatuses can include more operation steps or modular units, or include fewer operation steps or modular units after some operation steps or modular units are combined, based on conventions or non-creative efforts. For steps or structures logically having no necessary causal relationships, an execution sequence of the steps or the modular structure of the apparatus is not limited to the execution sequence or modular structure illustrated in the embodiments or accompanying drawings of the present specification. When being applied to an actual apparatuses, servers, or end-user device product, the method or modular structure can be executed sequentially or in parallel (for example, by parallel processors or in a multi-thread processing environment, or even in an implementation environment including a distributed processing server cluster) based on the methods or modular structures illustrated in the embodiments or accompanying drawings.

FIG. 1 shows a specific embodiment. Intel SGX can be selected as the core logic in a TEE to implement a client device of a blockchain system. In this way, a TEE program (or referred to as a TEE application) itself can authenticate data on a blockchain. The client device can publish the following information:

D01. a code measurement value of the TEE program, used to attest to the external that the TEE program will honestly authenticate data on blockchains;

D02. a public key of an asymmetric key pair in the TEE, where the private key corresponding to the public key is generated during internal initialization of the TEE and cannot be read from the external, and the public key is used by the TEE to sign cross-chain data to attest to the external that the data is from the client device of the trusted TEE;

D03. parameters for the initialization of the TEE program, for example, information about a blockchain that the client device of the TEE is connected to; and D04. remote attestation information of the previous three types of information of the TEE, where an attester can request a corresponding remote attester to verify the attestation information, to verify whether the previous three types of information are from the client device of the TEE.

In FIG. 1, blockchain A requests for data of blockchain B through the TEE application. The TEE program can include a simplified payment verification (SPV) client device connected to a blockchain. In SPV, an SPV node does not store all the blockchain data, but stores block head data so that the SPV client device needs a smaller overall storage capacity. Therefore, the SPV client device is also usually referred to as a lightweight client device or a light client device. Blockchain A that needs to read data across chains verifies and anchors the previous data D01 to D04, and uses the remote attestation information of the TEE to verify whether the previous data is from the TEE. Blockchain A compares the code measurement value of the TEE program to determine whether the TEE is the needed cross-chain TEE. Blockchain A also stores the public key of the asymmetric key pair in the TEE. The public key is used to verify and sign cross-chain data from the TEE. Blockchain A further stores the parameters for the initialization of the TEE program, the information about the blockchain that the client device of the TEE is connected to, so as to learn of the blockchain to which the TEE is bridged. The TEE program (TEE application) illustrated above includes a light client device. In specific implementations, it can be understood as that the TEE application includes a light client program module. It is a method that can be implemented in an application program by a person skilled in the art.

In an execution process, blockchain A that needs to read data across chains requests the TEE program to read cross-chain data. The TEE program uses the built-in client device (for example, an SPV client device) to request to step across to target blockchain B and verify data of target blockchain B. Then the TEE program can sign, by using the private key generated by Intel SGX, a request result that has been verified by the light client; and return the signed request result to blockchain A. The request result can include the cross-chain data or other related data information.

Blockchain A can use the previous anchored public key to verify the cross-chain data obtained from the TEE program, to verify that the cross-chain data has actually been verified by the trusted TEE program. In this way, blockchain A obtains the cross-chain data from blockchain B. In addition, the cross-chain data is from blockchain B that has been verified by using the built-in client device, and has been signed by the chip in the TEE. This ensures that the cross-chain data is sent after verified by the trusted TEE. Blockchain A that requests for authentication can use the corresponding public key for verification, and can use the cross-chain data after the cross-chain data passes the verification, to rapidly and efficiently implement authentication of the blockchain data across chains.

In the previous embodiment, one TEE program can be connected to one target blockchain, and the blockchain that requests for authentication can read the cross-chain data through the TEE program. When there are multiple blockchains, a corresponding TEE program can be configured for each blockchain. Or when a blockchain is added, a corresponding TEE program can be configured for the blockchain. In this way, the cross-chain data exchange processing method, provided in the present specification, that uses the TEE for attestation and conversion can achieve better scalability, effectively increase the throughput of cross-chain data processing, and improve the data processing performance between blockchain systems.

Figure 2:
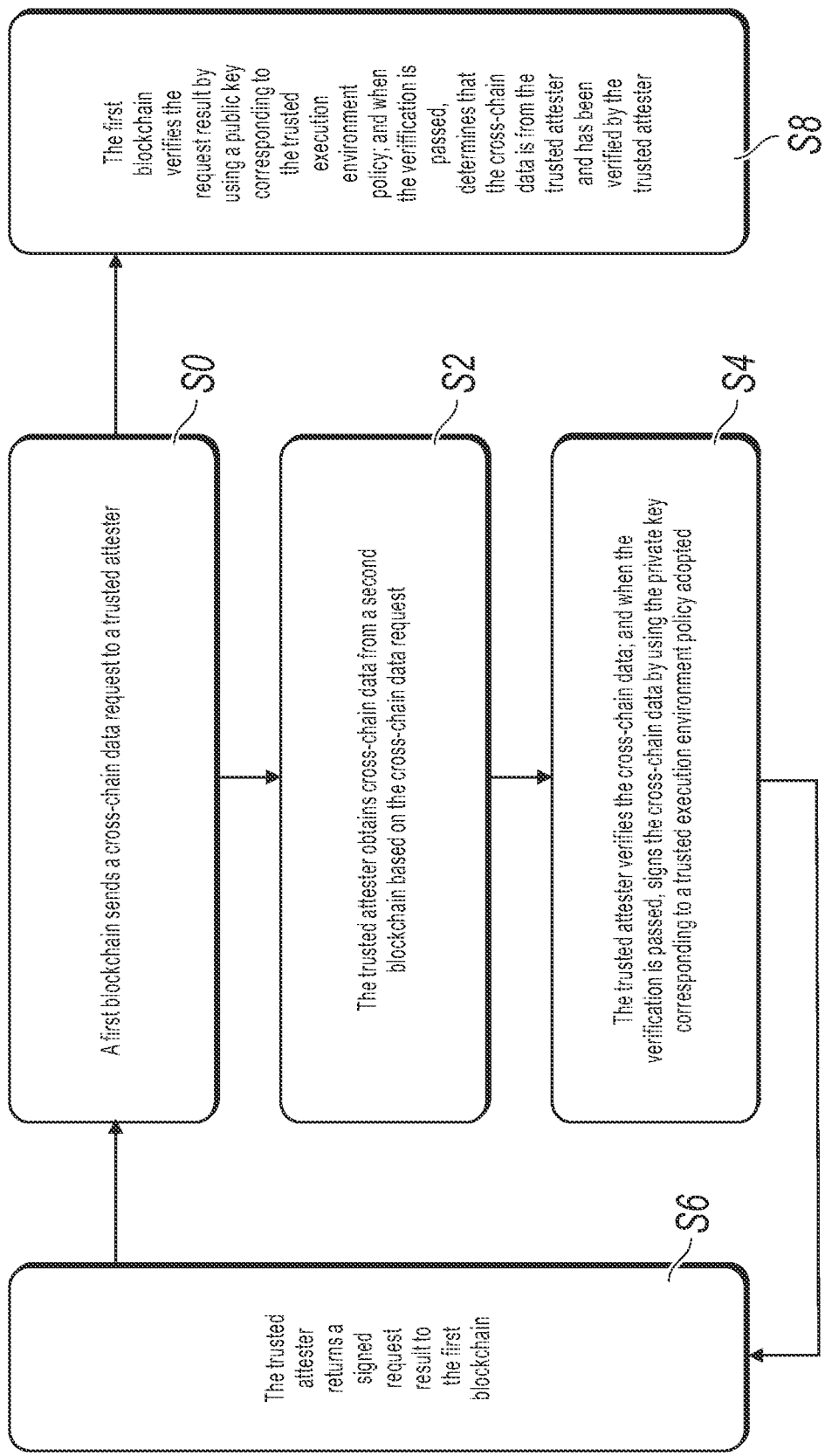
FIG. 2 is a schematic flowchart illustrating an embodiment of a cross-chain data processing method, according to the present specification.

Therefore, based on the descriptions of the previous implementation solution, in an embodiment of a cross-chain data processing method provided in the present specification, specifically as shown in FIG. 2, the method can include the following steps:

S0: A first blockchain sends a cross-chain data request to a trusted attester.

S2: The trusted attester obtains cross-chain data from a second blockchain based on the cross-chain data request.

S4: The trusted attester verifies the cross-chain data; and when the verification is passed, signs the cross-chain data by using a private key corresponding to a TEE policy adopted.

S6: The trusted attester returns a signed request result to the first blockchain.

S8: The first blockchain verifies the request result by using a public key corresponding to the TEE policy; and when the verification is passed, determines that the cross-chain data in the request result is from the trusted attester and has been verified by the trusted attester.

In the previous embodiment, an implementation of the trusted attester can include the previous TEE application. For example, an apparatus that is implemented by using program code, an end-user device, or a program module can serve as a relay for data exchanges between blockchains. The first blockchain can be the blockchain that requests for the cross-chain data from the trusted attester, and the second blockchain can be the target blockchain that returns the cross-chain data. The descriptions "first" and "second" in the first blockchain and the second blockchain do not limit the first blockchain and the second blockchain to specifically indicating fixed blockchains. In different trusted attesters, the first blockchain and the second blockchain can correspond to different blockchains.

The first blockchain sends a cross-chain data request to a trusted attester can be specifically a blockchain node on the first blockchain initiating the cross-chain data request. Accordingly, the obtaining cross-chain data from a second blockchain can be specifically obtaining the data from the second blockchain by using a blockchain node on the second blockchain.

It is worthwhile to note that in the previous embodiment, the TEE policy adopted by the trusted attester can include Intel SGX. However, other TEE policies such as the AMD PSP, the ARM TrustZone technology (applicable to all the ARM processors supporting TrustZone), and the x86-64 instruction set are not excluded from the present specification. In an implementation provided in the present specification, the TEE policy may be as follows:

S40: The TEE policy includes Intel SGX.

The trusted attester can use various methods to verify the data obtained from the second blockchain, for example, verify the integrity of the blockchain data or verify the blockchain data by using other public blockchains, private blockchains, or methods agreed in contracts. In an implementation provided in the present specification, SPV can be used, as described above. Specifically, a light SPV client device can be provided in the trusted attester, and blockchain data is verified by using blockchain head data. In SPV, an SPV node does not store all the blockchain data, but stores only block head data so that the SPV client device needs a smaller overall storage capacity. Therefore, the light SPV client device is also usually referred to as a lightweight client device, and implements rapid blockchain data verification. Therefore, in another embodiment provided in the present specification, the verifying the cross-chain data includes the following step:

S42: Verify the cross-chain data using SPV.

According to the cross-chain data processing method provided in this embodiment of the present specification, cross-chain data authentication can be implemented rapidly and efficiently based on a trusted bridge between TEE blockchains, to achieve high scalability of cross-chain data processing, extend applicability to more cross-chain data exchange scenarios, and efficiently increase the upper-limit of cross-chain data throughput traffic with ease, effectively alleviating the problems that a conventional POS-based consensus relay has limited application scenarios and is relatively low in efficiency and poor in performance.

In an implementation of the solution of the previous embodiment, one TEE program can correspond to one target blockchain, and one SPV client device corresponding to the target blockchain can be provided in the one TEE program. The present specification further provides another embodiment. In the another embodiment, multiple SPV client devices can be provided in one TEE program, and configuration information of a target blockchain corresponding to each SPV client device is stored, to implement a mapping relationship between the one TEE program and the multiple SPV client devices. Certainly, multiple TEE programs can be provided in parallel. For example, when there are 10 target blockchains, three TEE programs can be provided, for example, three processing apparatuses or relays, which are referred to as T1, T2, and T3. T1 is provided with three SPV client devices, T2 is provided with three SPV client devices, and T3 is provided with four SPV client devices. Each SPV client device corresponds to one target blockchain. Therefore, the present specification further provides an embodiment of another cross-chain data processing method. After the cross-chain data request sent by the first blockchain is received, the method further includes: determining a corresponding SPV client device (or referred to as an SPV application) based on the cross-chain data request; and accordingly, the obtaining cross-chain data from a second blockchain and verifying the cross-chain data includes: using the corresponding SPV client device (SPV application) to obtain the cross-chain data from the second blockchain and verify the cross-chain data.

In this way, by using the solution of this embodiment, cross-chain data exchanges can be extended more flexibly, the system design can be optimized, more proper layout settings support can be provided, and cross-chain data throughput traffic can be increased.

Figure 7:
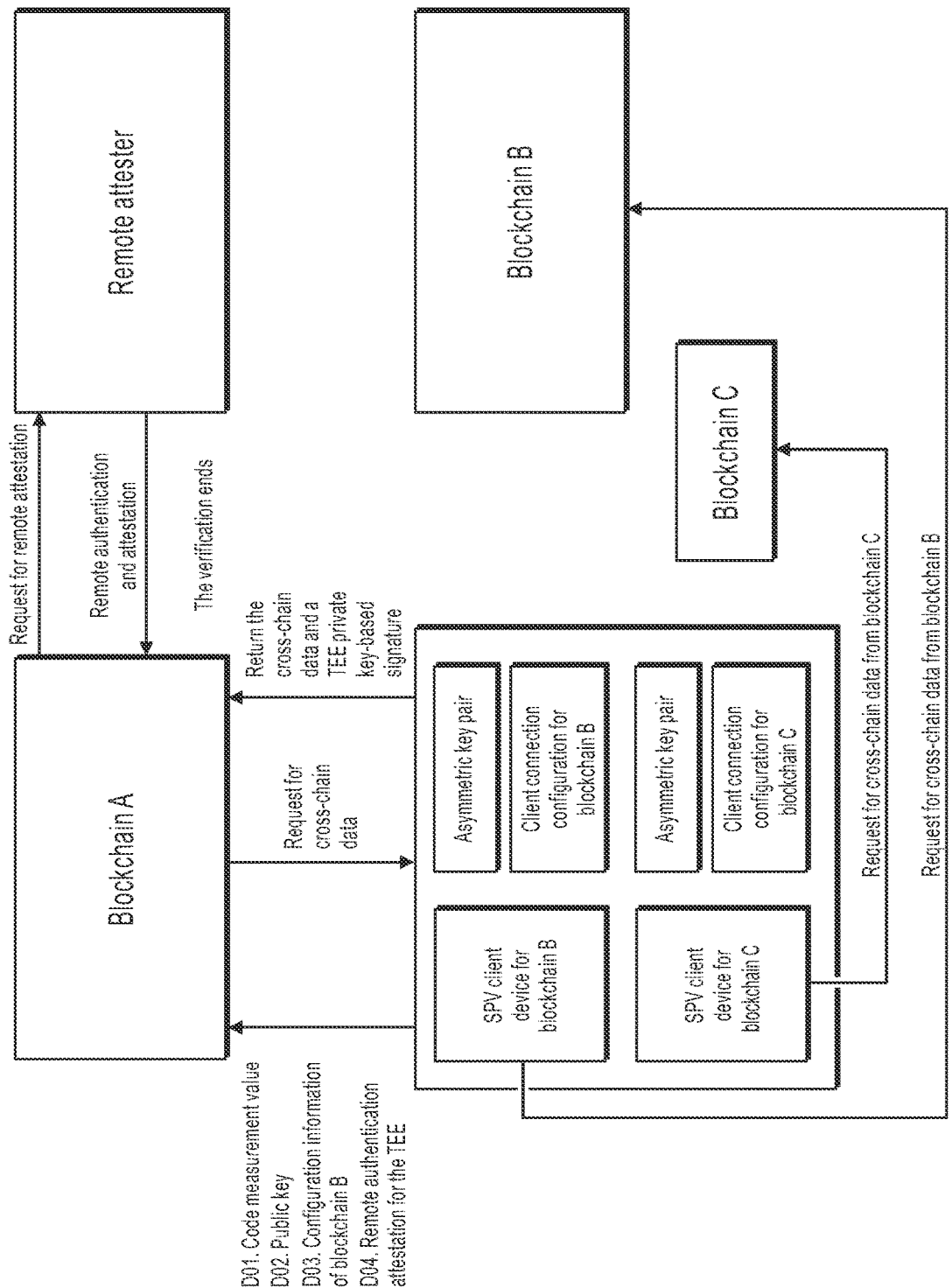
FIG. 7 is a schematic diagram illustrating another cross-chain data processing process and system structure, according to the present specification.

FIG. 7 is a schematic diagram illustrating another cross-chain data processing process and system structure, according to the present specification.

Figure 3:
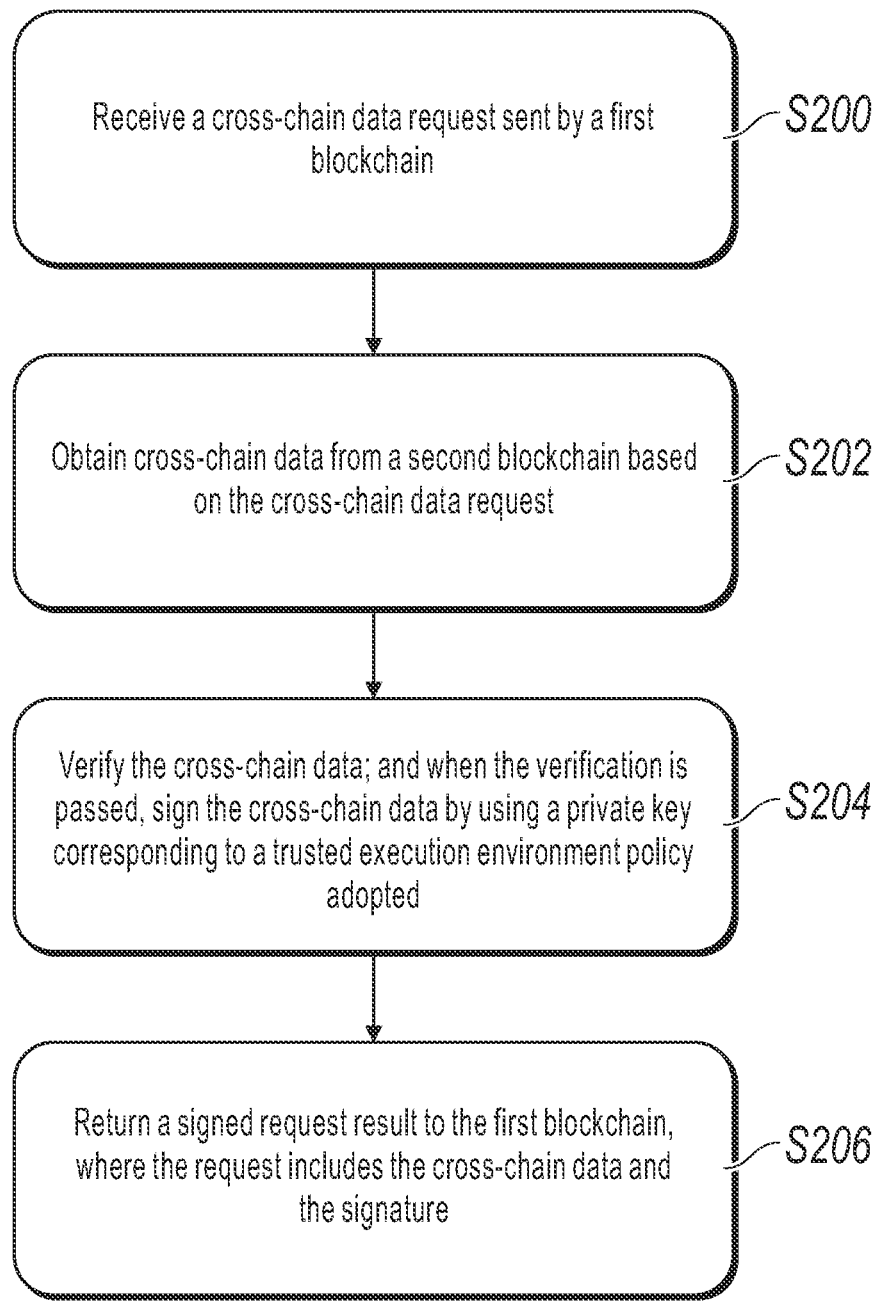
FIG. 3 is a schematic flowchart illustrating an embodiment of another cross-chain data processing method, according to the present specification.

Based on the descriptions of the method in the previous embodiments of data exchanges between multiple blockchains and a trusted attester, the present specification further provides a method embodiment that can be applied to the trusted attester (a relay for data exchanges between blockchains). A specific embodiment is shown in FIG. 3 and may include the following steps:

S200: Receive a cross-chain data request sent by a first blockchain.

S202: Obtain cross-chain data from a second blockchain based on the cross-chain data request.

S204: Verify the cross-chain data; and when the verification is passed, sign the cross-chain data by using a private key corresponding to a TEE policy adopted, where a public key corresponding to the TEE policy is published.

S206: Return a signed request result to the first blockchain, where the request result includes the cross-chain data and the signature.

The first blockchain verifies the request result by using the public key corresponding to the TEE policy; and when the verification is passed, determines that the cross-chain data in the request result is from the trusted attester and has been verified by the trusted attester.

With reference to the descriptions of the previous embodiments about multiple-side data exchanges, in another embodiment of the method, the TEE policy may be as follows:

S2040: The TEE policy includes Intel SGX.

With reference to the descriptions of the previous embodiments about multiple-side data exchanges, in another embodiment of the method, the verifying the cross-chain data includes the following step:

S2042: Verify the cross-chain data using SPV.

The previous method embodiments of the present specification are described in a progressive way. For same or similar parts of the embodiments, references can be made to the embodiment mutually. Each embodiment focuses on a difference from other embodiments. For related parts, references can be made to related descriptions in the method embodiments.

Figure 4:
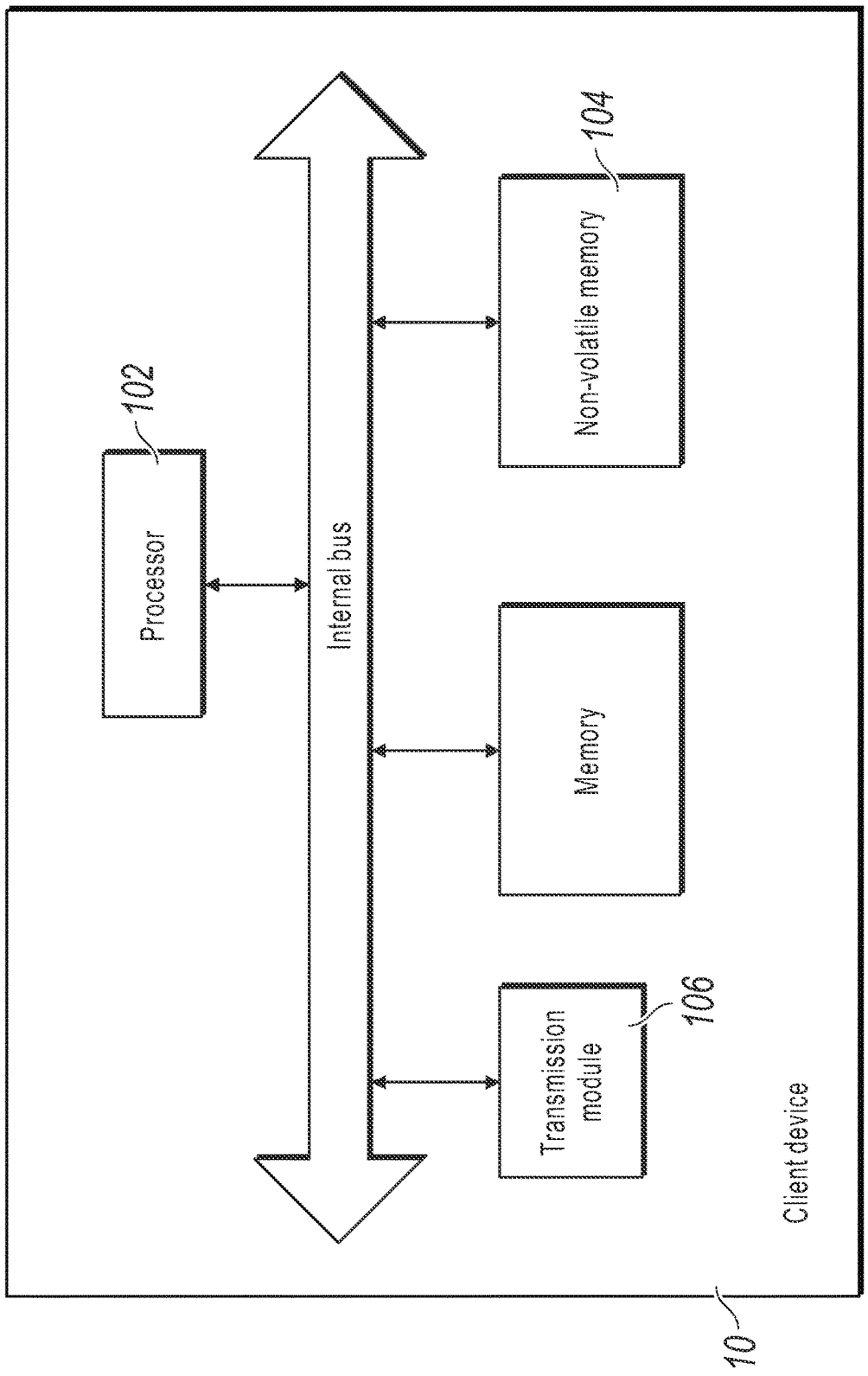
FIG. 4 is a block diagram illustrating a hardware structure of a client device that executes a cross-chain data processing method, according to an embodiment of the present specification.

The method embodiments provided in the embodiments of the present application can be executed in fixed end-user devices, mobile devices, servers, or similar computational apparatuses. For example, the method embodiments are executed on a server. FIG. 4 is a block diagram illustrating a hardware structure of a client device that executes a cross-chain data processing method, according to an embodiment of the present specification. Certainly, the method embodiments can also be applied to a blockchain node server. The hardware structure of the blockchain node server can be a hardware structure same as or similar to the hardware structure of the client device, or can have more or fewer hardware structures depending on an end-user device and a server device. Specifically, as shown in FIG. 4, the client device 10 can include one or more processors 102 (where one processor 102 is illustrated in the figure, and the processor 102 can include but is not limited to a processing apparatus such as a microcontroller unit (MCU) or a field programmable gate array (FPGA)), a memory 104 configured to store data, and a transmission module 106 configured to perform communication. A person with ordinary skills in the art can understand that the structure shown in FIG. 4 is merely intended for illustration but does not constitute a limitation on the structure of the previous electronic apparatus. For example, a server can alternatively include more or fewer components than the components shown in FIG. 4, for example, can further include other processing hardware or have a different configuration than the configuration shown in FIG. 4.

The memory 104 can be configured to store a software program and module of application software, for example, a program instruction or module corresponding to a cross-chain data processing method in the embodiments of the present invention. The processor 102 runs the software program and module stored in the memory 104 to execute various functional applications and data processing. The memory 104 can include a high-speed random access memory, and can further include a nonvolatile memory such as one or more magnetic storage apparatuses, flash memories, or other nonvolatile solid state memories. In some embodiments, the memory 104 can further include memories disposed remotely relatively to the processor 102. The remote memories can be connected to the client device 10 through a network. Embodiments of the network include but are not limited to the Internet, an enterprise intranet, a local area network (LAN), a mobile communications network, and a combination of such networks.

The transmission module 106 is configured to receive or send data through a network. Specific embodiments of the network can include a wireless network provided by a communications provider of the client device 10. In an embodiment, the transmission module 106 includes a network interface controller (NIC). The NIC can be connected to other network devices through a base station so as to communicate with the Internet. In an embodiment, the transmission module 106 can be a radio frequency (Radio Frequency, RF) module, and is configured to wirelessly communicate with the Internet.

Figure 5:
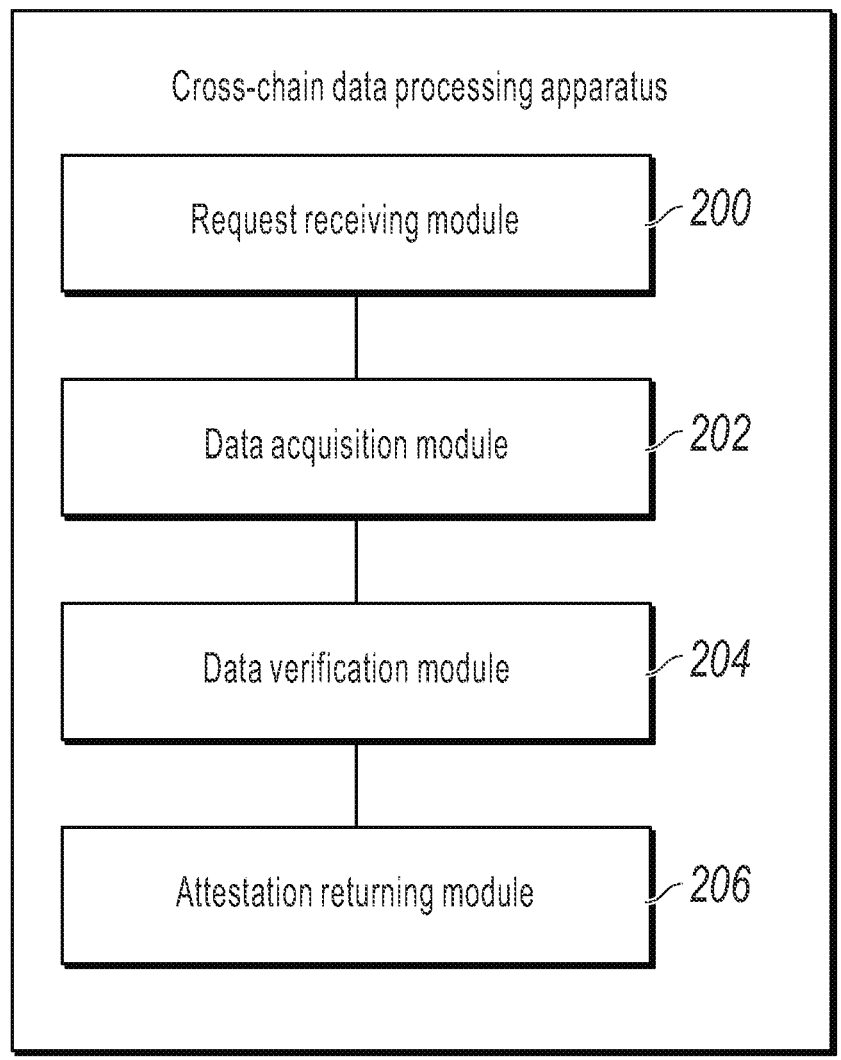
FIG. 5 is a schematic diagram illustrating a modular structure of an embodiment of a cross-chain data processing apparatus that can serve as a cross-chain relay, according to the present specification.

Based on the cross-chain data processing method described above, the present specification further provides a cross-chain data processing apparatus. The apparatus can include a system (including a distributed system), software (an application), a module, a component, a server, a client device etc. that use the method provided in the embodiments of the present specification and necessary hardware for implementation. Based on the same inventive idea, a processing apparatus in an embodiment provided in the present specification is described in the following embodiments. Implementations of the apparatus for alleviating problems are similar to the implementations of the method. Therefore, for specific implementations of the processing apparatus in this embodiment of the present specification, references can be made to the previous implementations of the method. Details are omitted here for simplicity. Although the apparatus described in the following embodiments can be preferably implemented by software, implementations by hardware or a combination of software and hardware are also possible and conceived. Specifically, FIG. 5 is a schematic diagram illustrating a modular structure of an embodiment of a cross-chain data processing apparatus provided in the present specification, where the apparatus can serve as a cross-chain relay. The apparatus can be implemented as a standalone client apparatus or server, a processor or server cluster, or a distributed system. Specifically, the apparatus can include: a request receiving module 200, which can be configured to receive a cross-chain data request sent by a first blockchain; a data acquisition module 202, which can be configured to obtain cross-chain data from a second blockchain based on the cross-chain data request; a data verification module 204, which can be configured to verify the cross-chain data; and when the verification is passed, sign the cross-chain data by using a private key corresponding to a TEE policy adopted, where a public key corresponding to the TEE policy is published; and an attestation returning module 206, which can be configured to return a signed request result to the first blockchain, where the request result includes the cross-chain data and the signature.

With reference to the previous descriptions of the method embodiments, in another embodiment of the apparatus, the TEE policy adopted by the data verification module 204 includes Intel SGX.

With reference to the previous descriptions of the method embodiments, in another embodiment of the apparatus, the data verification module 204 can include: an SPV unit 2041, which can be configured to verify the cross-chain data using SPV.

Figure 6:
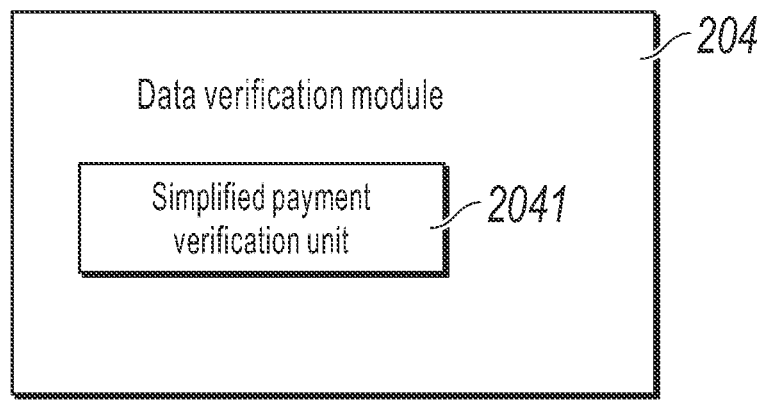
FIG. 6 is a schematic diagram illustrating a modular structure of another embodiment of the apparatus, according to the present specification.

FIG. 6 is a schematic diagram illustrating a modular structure of another embodiment of the apparatus, according to the present specification.

In another embodiment, the apparatus further includes: a handler determining module, which can be configured to determine a corresponding SPV application based on the cross-chain data request after the cross-chain data request sent by the first blockchain is received; and accordingly, the data acquisition module obtains cross-chain data from a second blockchain and the data verification module verifies the cross-chain data, including: using the corresponding SPV application to obtain the cross-chain data from the second blockchain and verify the cross-chain data.

It is worthwhile to note that, based on the descriptions of the related method embodiments, the apparatus described in the previous embodiments of the present specification can further include other implementations. For specific implementations, references can be made to the descriptions of the method embodiments. Details are omitted here for simplicity.

The embodiments in the present specification are described in a progressive way. For same or similar parts of the embodiments, references can be made to the embodiments mutually. Each embodiment focuses on a difference from other embodiments. An apparatus embodiment is basically similar to a method embodiment, and therefore is described briefly. For related parts, references can be made to related descriptions in the method embodiment.

The cross-chain data processing method and apparatus provided in the embodiments of the present specification can be implemented by a processor executing related program instructions in a computer, for example, implemented on a personal computer (PC) by using the c++ language of the WINDOWS OS, implemented by using application design languages corresponding to other OSs such as LINUX, ANDROID, and IOS in combination with necessary hardware, implemented based on multi-server processing of a distributed system, or implemented based on processing logic of a quantum computer. Specifically, in a client device embodiment for implementing the previous method or apparatus provided in the present specification, the client device can include a processor and a memory that is configured to store a processor-executable instruction, where when executing the instruction, the processor implements the steps of: receiving a cross-chain data request sent by a first blockchain; obtaining cross-chain data from a second blockchain based on the cross-chain data request; verifying the cross-chain data; and when the verification is passed, signing the cross-chain data by using a private key corresponding to a TEE policy adopted; and returning a signed request result to the first blockchain, where the request result includes the cross-chain data and the signature.

As described above, in other embodiments of the client device, the TEE policy includes Intel SGX. Alternatively, when executing the instruction to verify the cross-chain data, the processor verifies the cross-chain data using SPV.

The instruction described above can be stored in various types of computer-readable storage media. The computer-readable storage media can include a physical apparatus that is configured to store information and that can digitalize the information and store the information in a medium in an electrical, magnetic, or optical form. The computer-readable storage media in this embodiment can further include an apparatus that stores information by using electric energy, for example, various memories such as a random access memory (RAM) and a read-only memory (ROM); an apparatus that stores information by using magnetic energy, for example, a hard disk, a floppy disk, a magnetic tape, a magnetic-core memory, a magnetic bubble memory, or a USB flash drive; and an apparatus that stores information in an optical form, for example, a compact disc (CD) or a digital versatile disc (DVD). Certainly, readable storage media in other forms are also available, for example, a quantum memory and a graphene memory. The instruction in the following apparatus, server, client device, or system is the same as the instruction described above.

The apparatus or client device described above can be deployed in a blockchain system, can implement blockchain protocols, can authenticate data in the blockchain system, and can send blockchain data to other corresponding blockchains in response to requests from the blockchains while interacting with connected blockchains, to implement data exchanges across the blockchains. Therefore, the present specification further provides a blockchain system. The system includes the apparatus or client device according any embodiments of the present specification.

In an embodiment of the cross-chain system provided in the present specification, the cross-chain system can include multiple blockchains. A target blockchain that is allowed to provide data to other blockchains can be provided with a corresponding relay. The relay can be the client device, trusted attester, or apparatus described above. In this way, highly efficient and highly scalable cross-chain data exchanges can be implemented in the entire cross-chain system. Specifically, a cross-chain system is provided, including at least two blockchains and a relay that corresponds to a target blockchain that returns cross-chain data, where a blockchain that requests for data obtains the cross-chain data from the target blockchain by using the corresponding relay, and the relay includes the apparatus according to any one of the embodiments of the present specification or any one of the method implementations of the present specification.

When performance of a device for cross-chain data exchanges needs to be scaled up because a new blockchain is connected to the blockchain system, a relay can be added in some embodiments of the present specification, to efficiently and conveniently implement the scale-up. Therefore, in another embodiment of the cross-chain system, when a new blockchain is connected to the cross-chain system and the new blockchain is allowed to exchange cross-chain data with at least one blockchain in the cross-chain system, a relay is added and configured for the new blockchain.

It is worthwhile to note that, based on the descriptions of the apparatuses, client devices, system etc. described in the previous embodiments of the present specification can further include other implementations. For specific implementations, references can be made to the descriptions of the method embodiments. Details are omitted here for simplicity.

The embodiments in the present specification are described in a progressive way. For same or similar parts of the embodiments, references can be made to the embodiments mutually. Each embodiment focuses on a difference from other embodiments. Particularly, a hardware+program type embodiment is basically similar to a method embodiment, and therefore is described briefly. For related parts, references can be made to related descriptions in the method embodiment.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

According to the cross-chain data processing methods, apparatuses, and client devices, and the blockchain systems provided in the embodiments of the present specification, data exchanges between blockchains can be implemented based on a TEE, to rapidly and efficiently implement cross-chain data authentication, implement high scalability of cross-chain data processing, and extend applicability to more cross-chain data exchange scenarios. With the solutions in the embodiments of the present specification, an upper-limit of cross-chain data throughput traffic can be increased efficiently with ease, effectively alleviating the problems that a conventional POS-based consensus relay has limited application scenarios and is relatively low in efficiency and poor in performance.

Although the present application provides the method operation steps illustrated in the embodiments or flowcharts, more or fewer operation steps can be included, based on conventions or non-creative efforts. A sequence of steps listed in an embodiment is merely one of various step execution sequences and does not indicate a sole execution sequence. In practice, when being executed by an apparatus or a client product, the steps can be executed sequentially or in parallel (for example, by parallel processors or in a multi-thread processing environment) based on the method illustrated in the embodiments or the accompanying drawings.

Although data descriptions and data acquisition, storage, exchange, computation, determining, and other operations such as using the SPV client device to verify the data of the target blockchain, selecting Intel SGX to implement the TEE, and using a relay for data exchanges are illustrated in the content of the embodiments of the present specification, it is not limited that the embodiments of the present specification must conform to industrial communications standards, standard blockchain protocols, communications protocols, and standard network modules or templates, or the situations described in the embodiments of the present specification. Some industrial standards, customized implementation solutions, or implementation solutions obtained by slightly modifying the implementations described in the embodiments can also achieve same, equivalent, or similar implementation effects as the previous embodiments or achieve predictable variant implementation effects. Embodiments obtained by applying such modifications or variations to the data acquisition, storage, determining, and processing methods can still fall within the scope of optional implementation solutions of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, an FPGA) is such an integrated circuit, and a logical function of the PLD is determined by a user through device programming. The designer performs programming to "integrate" a digital system to a PLD without requesting a chip manufacturer to design and produce an application-specific integrated circuit (ASIC) chip. In addition, at present, instead of manually manufacturing an integrated circuit chip, this type of programming is mostly implemented by using "logic compiler" software. The software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an ASIC, a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the ASIC, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. Specifically, the computer can be a personal computer, a laptop computer, an on-board human-computer interaction device, a cellular phone, a camera phone, a smartphone, a personal digital assistant (PDA), a media player, a navigation device, an email device, a game console, a tablet computer, a wearable device, or any combination of these devices.

Although the embodiments of the present specification provide the method operation steps illustrated in the embodiments or flowcharts, more or fewer operation steps can be included, based on conventions or non-creative means. A sequence of steps listed in an embodiment is merely one of various step execution sequences and does not indicate a sole execution sequence. In practice, when being executed by an apparatus or an end-user device product, the steps can be executed sequentially or in parallel (for example, by parallel processors or in a multi-thread processing environment, or even in a distributed data processing environment) based on the method illustrated in the embodiments or the accompanying drawings. The terms "include", "contain", or their any other variants are intended to cover a non-exclusive inclusion, so a process, a method, a product, or a device that includes a list of elements not only includes those elements but also includes other elements which are not expressly listed, or further includes elements inherent to such process, method, product, or device. Without more constraints, the existence of additional identical or equivalent elements in the process, method, product or device that includes the elements is not excluded.

For ease of description, the apparatus above is described by dividing functions into various modules. Certainly, during implementation of the embodiments of the present specification, the functions of the modules can be implemented in the same one or more pieces of software or hardware or the same combination of one or more pieces of software and hardware, modules implementing the same function can be implemented by using a combination of multiple sub-modules or sub-units, etc. The described apparatus embodiments are merely examples. For example, the unit division is merely logical function division and there can be other division methods in actual implementation. For example, multiple units or components may be combined or integrated into another system, or some features can be ignored or not performed. In addition, the displayed or discussed mutual couplings or direct couplings or communication connections may be implemented by using some interfaces. The indirect couplings or communication connections between the apparatuses or units can be implemented in electronic, mechanical, or other forms.

A person skilled in the art also knows that, in addition to implementing the controller by using the computer readable program code, logic programming can be performed on method steps to allow the controller to implement the same function in forms of the logic gate, the switch, the ASIC, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The present specification is described with reference to the flowcharts and/or block diagrams of the method, the device (system), and the computer program product based on the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a RAM, a non-volatile memory, and/or another form that are in a computer readable medium, for example, a ROM or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a DVD, or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory computer readable media such as a modulated data signal and carrier.

A person skilled in the art should understand that an embodiment of the present specification can be provided as a method, a system, or a computer program product. Therefore, the embodiments of the present specification can use a form of hardware only embodiments, software only embodiments, or embodiments with a combination of software and hardware. Moreover, the embodiments of the present specification can use a form of a computer program product that is implemented on one or more computer-usable storage media (including but not limited to a disk memory, a CD-ROM, an optical memory, etc.) that include computer-usable program code.

The embodiments of the present specification can be described in the general context of computer-executable instructions, for example, a program module. Generally, the program module includes a routine, a program, an object, a component, a data structure, etc. executing a specific task or implementing a specific abstract data type. The embodiments of the present specification can alternatively be practiced in a distributed computing environment. In the distributed computing environment, tasks are performed by remote processing devices that are connected through a communications network. In the distributed computing environment, the program module can be located in both local and remote computer storage media including storage devices.

The embodiments in the present specification are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment. In the descriptions of the present specification, descriptions provided with reference to terms such as "an embodiment", "some embodiments", "an example", "a specific example", or "some examples" intend to mean that a specific feature, structure, material, or characteristic described with reference to the embodiment or example is included in at least one embodiment or example of the embodiments of the present specification. In the present specification, illustrative expressions of the previous terms are not necessarily intended for the same embodiment or example. In addition, the described specific feature, structure, material, or characteristic can be combined in a proper way in any one or more embodiments or examples. Moreover, a person skilled in the art can combine and associate different embodiments or examples and features of different embodiments or examples described in the present specification, provided that the embodiments or examples and the features do not conflict with each other.

The previous descriptions are merely embodiments of the present specification and are not intended for limiting the embodiments of the present specification. A person skilled in the art knows that the embodiments of the present specification can have various modifications and changes. Any modifications, equivalent replacements, and improvements made within the spirit and principle of the embodiments of the present specification shall fall within the scope of the claims in the present specification.

What is claimed is:

1. A computer-implemented cross-chain attestation method, comprising:
   transmitting, by a trusted execution environment (TEE) application, to a first blockchain, configuration information of a second blockchain, and remote attestation information of the configuration information,
      wherein the remote attestation information of the configuration information comprises proof that the configuration information is associated with the TEE application;
   subsequent to transmitting the remote attestation information and the configuration information, receiving, by the TEE application, a cross-chain data request from a first blockchain node of the first blockchain;

after receiving the cross-chain data request, obtaining, by the TEE application, cross-chain data corresponding to the cross-chain data request from a second blockchain node of the second blockchain;

verifying, by the TEE application, the cross-chain data;

generating, by the TEE application, a signature using a private key of the TEE application, wherein a public key corresponding to the private key is stored in the first blockchain; and returning, by the TEE application, the cross-chain data and the signature to the first blockchain node.

2. The computer-implemented method of claim 1, wherein the TEE application comprises a simple payment verification (SPV) node of the second blockchain, and wherein verifying the cross-chain data comprises:

verifying the cross-chain data based on header data of the second blockchain, wherein the header data is stored in the SPV node.

3. The computer-implemented method of claim 2, wherein the TEE application comprises a plurality of SPV nodes corresponding to different respective blockchains, including the SPV node of the second blockchain;

wherein the method further comprises selecting, by the TEE application, the SPV node of the second blockchain based on the cross-chain data request; and wherein obtaining the cross-chain data comprises obtaining the cross-chain data using the SPV node.

4. The computer-implemented method of claim 1, comprising:

prior to receiving the cross-chain data request, transmitting, by the TEE application, to the first blockchain, the public key, a code measurement value, and initialization information of the TEE application.

5. The computer-implemented method of claim 1, wherein the TEE application operates as an enclave isolated from communication with another portion of a computing device in which the TEE application is located.

6. A non-transitory, computer-readable medium storing one or more instructions that, when executed by a computer system, cause the computer system to perform operations comprising:

transmitting, by a trusted execution environment (TEE) application, to a first blockchain, configuration information of a second blockchain, and remote attestation information of the configuration information, wherein the remote attestation information of the configuration information comprises proof that the configuration information is associated with the TEE application;

subsequent to transmitting the remote attestation information and the configuration information, receiving, by the TEE application, a cross-chain data request from a first blockchain node of the first blockchain;

after receiving the cross-chain data request, obtaining, by the TEE application, cross-chain data corresponding to the cross-chain data request from a second blockchain node of the second blockchain;

verifying, by the TEE application, the cross-chain data;

generating, by the TEE application, a signature using a private key of the TEE application, wherein a public key corresponding to the private key is stored in the first blockchain; and returning, by the TEE application, the cross-chain data and the signature to the first blockchain node.

7. The non-transitory, computer-readable medium of claim 6, wherein the TEE application comprises a simple payment verification (SPV) node of the second blockchain, and wherein verifying the cross-chain data comprises:

verifying the cross-chain data based on header data of the second blockchain, wherein the header data is stored in the SPV node.

8. The non-transitory, computer-readable medium of claim 7, wherein the TEE application comprises a plurality of SPV nodes corresponding to different respective blockchains, including the SPV node of the second blockchain;

wherein the operations further comprise selecting, by the TEE application, the SPV node of the second blockchain based on the cross-chain data request; and wherein obtaining the cross-chain data comprises obtaining the cross-chain data using the SPV node.

9. The non-transitory, computer-readable medium of claim 6, wherein the operations comprise:

prior to receiving the cross-chain data request, transmitting, by the TEE application, to the first blockchain, the public key, a code measurement value, and data indicating one or more blockchains with which the TEE application is configured to communicate.

10. The non-transitory, computer-readable medium of claim 6, wherein the TEE application operates as an enclave isolated from communication with another portion of the computer system in which the TEE application is located.

11. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

transmitting, by a trusted execution environment (TEE) application, to a first blockchain, configuration information of a second blockchain, and remote attestation information of the configuration information, wherein the remote attestation information of the configuration information comprises proof that the configuration information is associated with the TEE application;

subsequent to transmitting the remote attestation information and the configuration information, receiving, by the TEE application, a cross-chain data request from a first blockchain node of the first blockchain;

after receiving the cross-chain data request, obtaining, by the TEE application, cross-chain data corresponding to the cross-chain data request from a second blockchain node of the second blockchain;

verifying, by the TEE application, the cross-chain data;

generating, by the TEE application, a signature using a private key of the TEE application, wherein a public key corresponding to the private key is stored in the first blockchain; and returning, by the TEE application, the cross-chain data and the signature to the first blockchain node.

12. The computer-implemented system of claim 11, wherein the TEE application comprises a simple payment verification (SPV) node of the second blockchain, and wherein verifying the cross-chain data comprises:

verifying the cross-chain data based on header data of the second blockchain, wherein the header data is stored in the SPV node.

13. The computer-implemented system of claim 12, wherein the TEE application comprises a plurality of SPV nodes corresponding to different respective blockchains, including the SPV node of the second blockchain;

wherein the operations further comprise selecting, by the TEE application, the SPV node of the second blockchain based on the cross-chain data request; and wherein obtaining the cross-chain data comprises obtaining the cross-chain data using the SPV node.

14. The computer-implemented system of claim 11, wherein the operations comprise:

prior to receiving the cross-chain data request, transmitting, by the TEE application, to the first blockchain, the public key, a code measurement value, and initialization information of the TEE application.

15. The computer-implemented system of claim 11, wherein the TEE application operates as an enclave isolated from communication with another portion of the computer-implemented system in which the TEE application is located.

* * * * *